United States Patent
Bitsche et al.

(10) Patent No.: US 7,291,420 B2
(45) Date of Patent: Nov. 6, 2007

(54) HEAT EXCHANGER STRUCTURE FOR A PLURALITY OF ELECTROCHEMICAL STORAGE CELLS

(75) Inventors: Otmar Bitsche, Stuttgart (DE); Johann German, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 313 days.

(21) Appl. No.: 10/332,810

(22) PCT Filed: Jun. 29, 2001

(86) PCT No.: PCT/EP01/07491

§ 371 (c)(1),
(2), (4) Date: Sep. 29, 2003

(87) PCT Pub. No.: WO02/07249

PCT Pub. Date: Jan. 24, 2002

(65) Prior Publication Data

US 2004/0069620 A1    Apr. 15, 2004

(30) Foreign Application Priority Data

Jul. 13, 2000    (DE) ................................ 100 34 134

(51) Int. Cl.
*H01M 10/50*    (2006.01)

(52) U.S. Cl. ...................................... 429/120; 429/149
(58) Field of Classification Search ................. 429/120
See application file for complete search history.

(56) References Cited

U.S. PATENT DOCUMENTS 5,879,833 A * 3/1999 Yoshii et al. ................. 429/62
2002/0177035 A1 * 11/2002 Oweis et al. ............... 429/120

FOREIGN PATENT DOCUMENTS

| DE | 9002249 U1 | 6/1990 |
| DE | 19849491 C1 | 1/2000 |
| EP | 0177225 A1 | 4/1986 |
| EP | 0917230 A1 | 5/1999 |

* cited by examiner

*Primary Examiner*—Jonathan Crepeau
*Assistant Examiner*—Tony Chuo
(74) *Attorney, Agent, or Firm*—Crowell & Moring LLP (57) ABSTRACT

A heat exchanger structure for a plurality of electrochemical storage cells has at least one duct component through which thermal control medium flows. The duct component has two material strips which are arranged parallel to one another and between which a heat exchanger duct is formed. The material strips have shaped portions adapted to the storage cells. The heat exchanger structure is useable, for example, for a motor vehicle battery.

14 Claims, 8 Drawing Sheets

HEAT EXCHANGER STRUCTURE FOR A PLURALITY OF ELECTROCHEMICAL STORAGE CELLS

BACKGROUND AND SUMMARY OF THE INVENTION

This invention relates to a heat exchanger structure for a plurality of electrochemical storage cells, with at least one duct component through which thermal control medium flows.

German patent specification DE 198 49 491 C1 discloses a device for the thermal control of a plurality of electrochemical storage cells, in which heat exchanger ducts are arranged between a plurality of layers of parallelepipedic storage cells. The heat exchanger ducts issue into distributors and are connected to the distributors to form a rigid grid-like frame. The heat exchanger ducts are designed as tubular elements of rectangular cross section and support the storage cells. To fix the storage cells, spacers are provided, which, within a layer of storage cells, retain these at a predetermined distance from one another. Furthermore, German publication DE 90 02 249 U1 and European publication EP 0 917 230 A1 each disclose a heat exchanger structure for a plurality of electrochemical storage cells, with at least one duct component through which thermal control media flow. The duct component of the heat exchanger structure disclosed from EP 0 917 230 A1 has shaped portions adapted to the storage cells.

One object of this invention is to provide a heat exchanger structure for a plurality of electrochemical storage cells, which, along with a simple construction, allows a good thermal control of the individual storage cells.

For this purpose, according to the invention, a heat exchanger structure having the features claimed is provided. By a heat exchanger duct being formed between two parallel material strips which have shaped portions adapted to the storage cells, the storage cells are held by the duct component with a form fit. There is therefore no need for any additional spacer or holding elements in order to secure the storage cells against slipping out of place. By the material strips engaging on the storage cells with a form fit, a large contact surface and consequently a good thermal control of the storage cells are obtained. The shaped portions, adapted to the storage cells, of the material strips may in this case be produced simply by the bending of the material strips or even during the manufacturing process.

Advantageous developments of the invention are specified in the dependent claims.

Since the duct component has supporting members arranged at adjacent longitudinal edges of the material strips and each having a spacer web extending between the material strips, a particularly simple construction of the duct component from only four components, to be precise two material strips and two supporting members, is obtained. With the aid of the spacer web extending between the material strips, the distance between the material strips arranged parallel to one another and consequently the cross section of the heat exchanger duct are defined. A particularly simple mounting of the duct component is obtained when the supporting member has a fixing web which extends perpendicularly to the spacer web and which is adapted to the shaped portions of the material strips. The supporting member therefore merely has to be introduced between the material strips, until the longitudinal edges of the material strips butt against the fixing web. The supporting member may in this case be produced in one piece with the spacer web and with the fixing web, this being conducive to the simple construction of the heat exchanger structure.

A constant cross section of the heat exchanger duct can be ensured in a simple way by providing a spacer strip extending in the longitudinal direction of the material strips between the two material strips of the duct component in their middle region. In this way, for example, two heat exchanger ducts can also be produced in one duct component. The heat exchanger structure is suitable in a particular way for being arranged between two layers of storage cells when the duct component has two heat exchanger ducts between two material strips in each case, one heat exchanger duct lying on a top side and the other heat exchanger duct on an underside of the duct component. The cooling ducts may in this case be symmetrical to one another, as a result of which, along with a simple construction, a forward flow and the return flow of the thermal control medium between two layers of storage cells can be implemented. A contribution to a simple construction is made by the fact that two one-piece supporting members are provided, which connect the four material strips of the two heat exchanger ducts at their adjacent longitudinal edges in each case. Even when two heat exchanger ducts are provided for each duct component, the latter can be assembled in a simple way from four material strips and two supporting members.

One design of the heat exchanger structure is advantageous in that two duct components for receiving at least one storage cell are arranged opposite one another and in such a way that shaped portions extending in contra-directional directions are located opposite one another. This ensures not only a secure hold of a storage cell in the contra-directed shaped portions located opposite one another, but also the good thermal control, for example cooling, of the said storage cell due to a large contact surface between the heat exchanger ducts and the storage cell. Such a design also makes it possible to have a particularly space-saving arrangement of the storage cells in a plurality of layers, the individual layers of storage cells being capable of being offset to one another with the effect of a particularly compact arrangement.

When a plurality of duct components are arranged essentially in one plane and parallel to one another, adjacent end faces of the duct components being connected to a distributor, a planar module is obtained, which can be arranged between two layers of storage cells for the thermal control and fixing in position of the latter. The heat exchanger ducts are connected to distributor ducts in the distributors, and, when two heat exchanger ducts through which the flow passes contra-directionally are provided for each duct component, two distributors are likewise provided in the distributor component.

A particularly expedient modular configuration is obtained by the provision of at least two distributors which are connected by means of at least one fixing element running parallel to the duct components. A stable and flat module is thereby provided, in which the distributors in the storage cells are secured additionally by the fixing element. When three fixing elements are provided for each module, this results in a stable frame consisting of the distributors and of the fixing elements arranged at the ends and in the middle of the distributors. The duct components can consequently be of particularly lightweight design, since the frame is formed from the distributors and the fixing elements and the duct components therefore no longer have to assume a supporting function. The fixing element in this case also serves for securing the storage cells in the longitudinal and transverse directions of the frame. A plurality of such modules may be arranged one above the other in layers, in order, together with the storage cells, to form a stable composite structure.

For the thermal control of cylindrical storage cells, what are known as round cells, there is provision for the shaped portions of the material strips to have the form of cylinder segments. When, as seen in the longitudinal direction, the material strips have shaped portions with alternately contra-directional curvatures, a wavy shape of the material strips is obtained. When layers of storage cells are arranged in each case so as to be offset by the amount of half the wavelength of the wavy shape, a very high packing density of the storage cells, at the same time with good thermal control and good fixing in position of the storage cells, can be achieved. Particularly good thermal control of the storage cells by means of a large contact surface of the heat exchanger ducts with the storage cells is obtained when, as seen in the longitudinal direction, the material strips have shaped portions with co-directional curvatures. Such a design is particularly suitable for a non-offset arrangement of the individual layers of the storage cells in relation to one another.

The object mentioned above can also be achieved by means of an electrochemical energy store as claimed. In such an energy store, the storage cells are arranged in a plurality of parallel layers, thus resulting in a simple and compact construction of the energy store, along with a secure fixing and good thermal control of the storage cells.

A particularly compact construction of the energy store can be achieved when the thermal control medium between a first and a second layer of storage cells flows contra-directionally to the thermal control medium between the second and a third layer of storage cells. In such an arrangement, only one layer of heat exchanger ducts is necessary between two layers of storage cells, so that a flat construction of the energy store is obtained.

A particularly uniform thermal control of the storage cells of the energy store is obtained when the thermal control medium flows into two contra-directional directions between two layers of storage cells in heat exchanger ducts separated from one another. By virtue of the contra-flow of the thermal control medium between two layers, an insufficient cooling or thermal control of storage cells lying far downstream is avoided.

Further features and advantages of the invention are specified in the following description, with reference to the accompanying drawings.

DETAILED DESCRIPTION OF THE INVENTION

Figure 1:
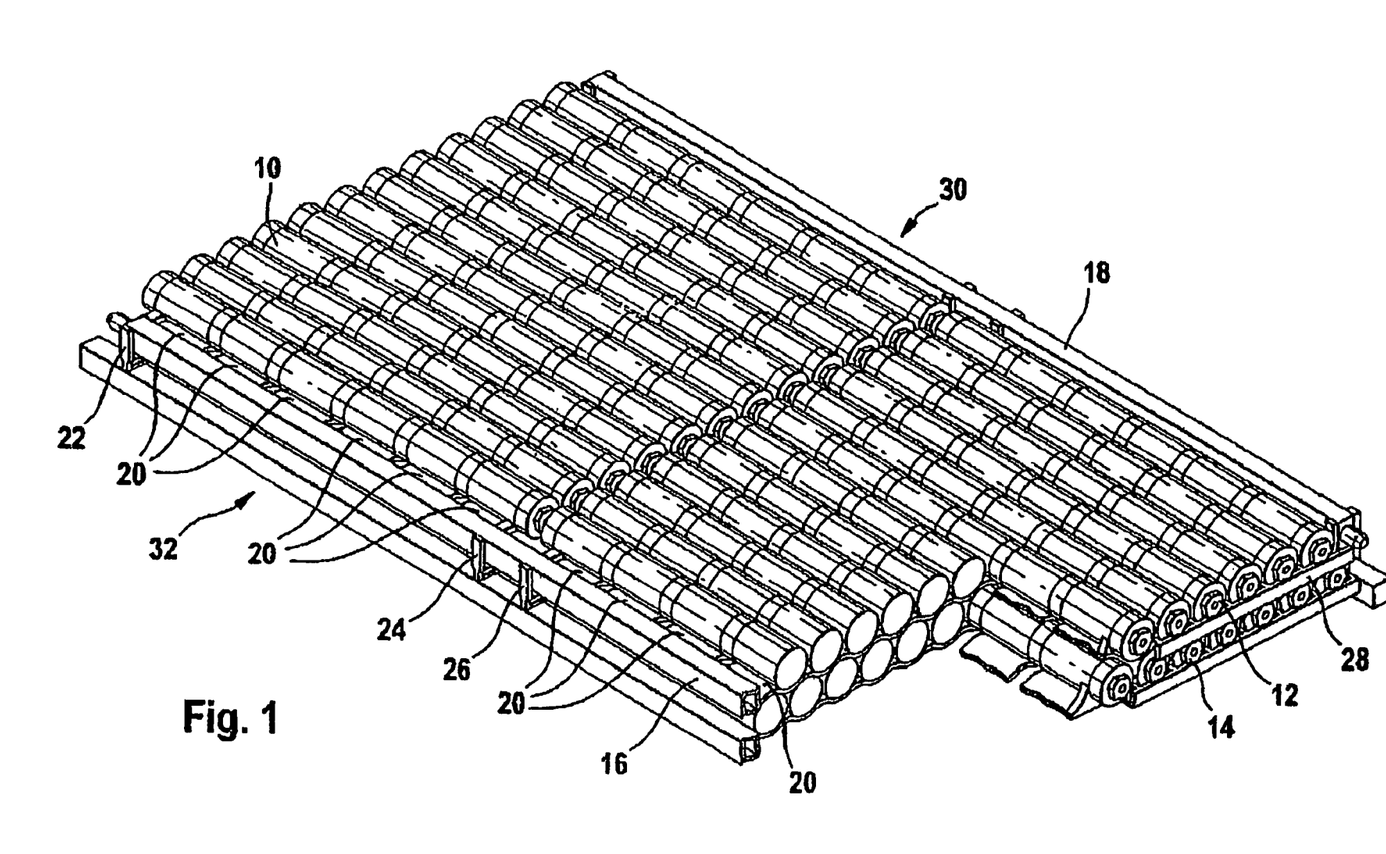
FIG. 1 shows a perspective partially sectional view of an energy store and of a heat exchanger structure according to a first embodiment of the invention.

The electrochemical energy store illustrated in FIG. 1 has a plurality of storage cells 10 which are arranged one above the other in two parallel layers 12 and 14. Between the layers 12 and 14 is arranged a heat exchanger structure which is used as a cooling device and has a first distributor 16 and a second distributor 18. The distributors 16 and 18, in each of which a distributor duct is arranged, lie parallel to the cylindrical storage cells 10 on the longitudinal sides of the layer 12. The distributors 16 and 18 are connected by means of a plurality of cooling-duct components 20 arranged parallel to one another. Adjacent end faces of the cooling-duct components 20 are connected to the distributor 16 or to the distributor 18. The distributor duct of the distributor 16 is consequently flow-connected to the distributor duct in the distributor 18 via heat exchanger ducts acting as cooling ducts and located in the cooling-duct components 20. The distributors 16 and 18 are also connected to one another by means of fixing elements 22, 24, 26 and 28. The fixing elements 22, 24, 26 and 28 form, with the distributors 16 and 18 and the cooling-duct components 20, a stable frame-like cooling module 30. Whilst the cooling module 30 is arranged between the layers 12 and 14 of the storage cells 10, a further cooling module 32, which is essentially structurally identical to the cooling module 30, is arranged below the layer 14 of storage cells. The energy store shown in FIG. 1 can be extended in a simple way by a further cooling module being placed onto the layer 12 of storage cells 10.

Figure 2:
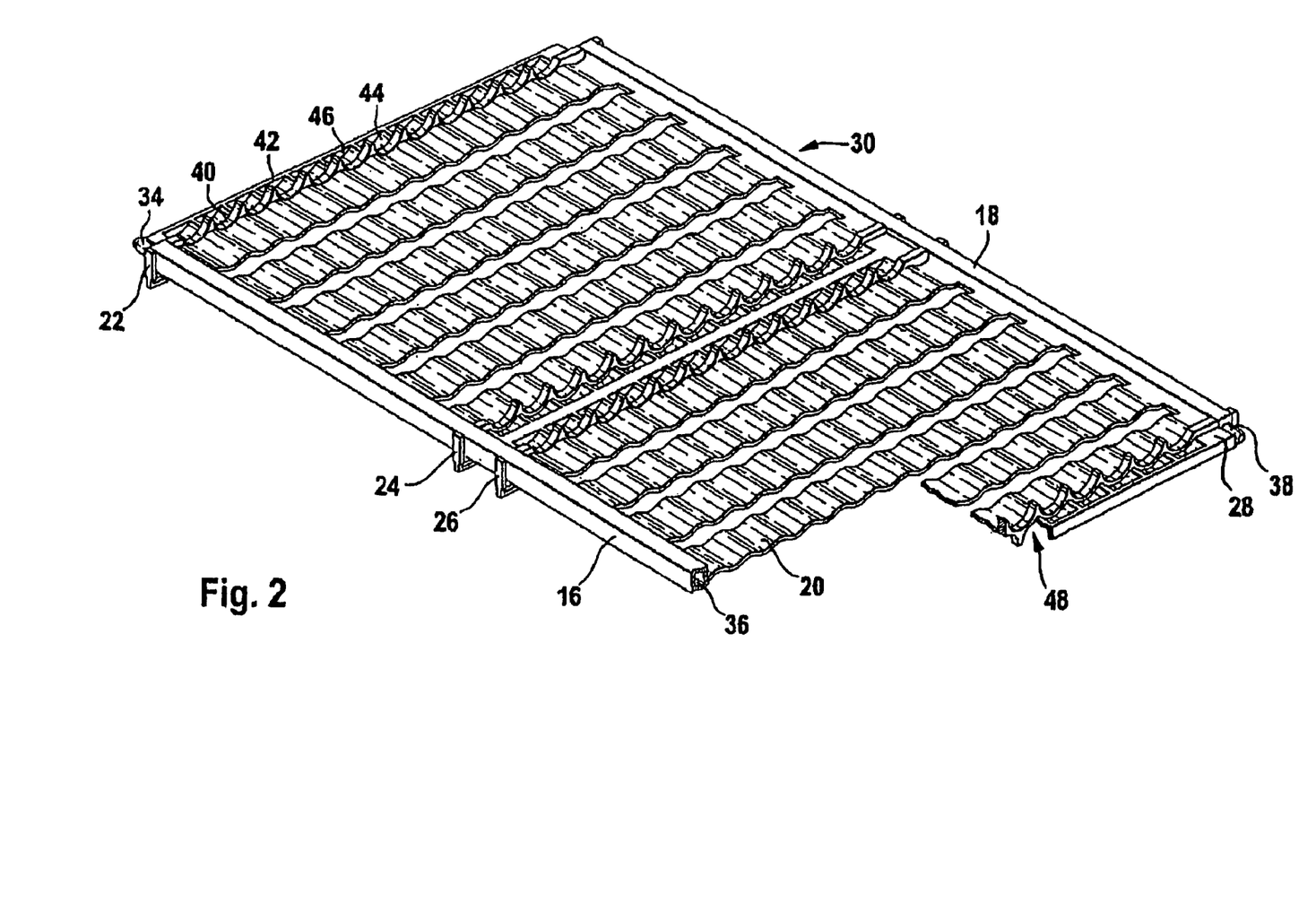
FIG. 2 shows a perspective partially sectional view of the heat exchanger structure shown in FIG. 1.

The illustration in FIG. 2 shows the cooling module 30 of FIG. 1. The distributor 16 is provided at one end with a connection piece 34, via which cooling liquid as a thermal control medium can pass into the distributor duct 36 in the distributor 16. The cooling liquid passes out of the distributor duct 36 into the cooling ducts in the cooling-duct components 20 and flows through these into the distributor duct in the distributor 18. The cooling liquid leaves the cooling module 30 via a connection piece 38 of the distributor 18, the connection piece being arranged diagonally opposite the connection piece 34.

The fixing elements 22, 24, 26 and 28 engage on the distributors 16 and 18 solely on the lower and lateral surfaces of the latter. The fixing elements 22, 24, 26 and 28 can therefore be pushed onto the distributors 16 and 18 from below. The fixing element 22 has a segment 40 which serves for fixing the storage cells in the lateral direction. For this purpose, the web-like segment 40 is provided with recesses which are in the form of a circle segment and into which the cylindrical storage cells are inserted and consequently secured against slipping out of place. A further segment 42 of the fixing element 22 serves mainly for securing the storage cells in the longitudinal direction and, for this purpose, has a web 46 at the end of a recess 44 in the form of a cylinder segment. The fixing element 28 arranged at the opposite end of the distributors 16 and 18 is constructed identically to the fixing element 22, in exactly the same way as the fixing elements 24 and 26 in the middle of the distributors 16, 18. However, the fixing elements 24 and 26 in the middle of the distributors 16 and 18 may also be connected to form a single one-piece component. The fixing elements 22, 24, 26 and 28 of the cooling module 30 have on their top side the recesses 40 and 44 and on their underside corresponding recesses for the layer of storage cells which is arranged underneath. Such recesses on the underside of the fixing elements can be seen at the partially sectionally illustrated fixing element 28 and are designated by the reference symbol 48.

Figure 3:
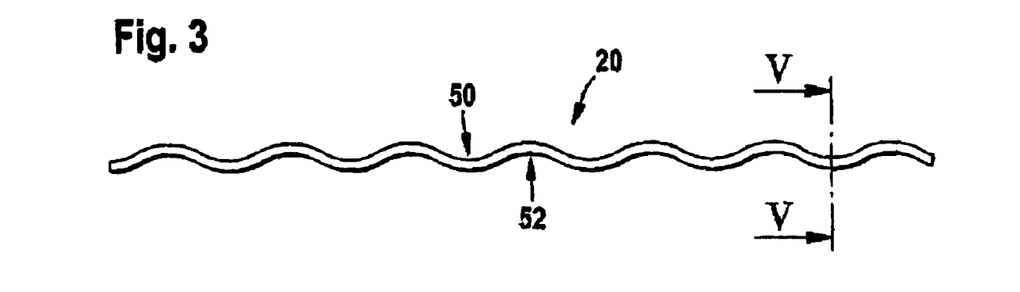
FIG. 3 shows a partial side view of a duct component used in the heat exchanger structure of FIG. 2.

It can be seen clearly from the side view of FIG. 3 that, as seen in the longitudinal direction, the cooling-duct component 20 has shaped portions 50, 52 with alternately contra-directional curvatures, thus resulting in a wavy shape of the cooling-duct component 20. The shaped portions 50 and 52 are adapted to the cylindrical shape of the storage cells 10.

Figure 4:
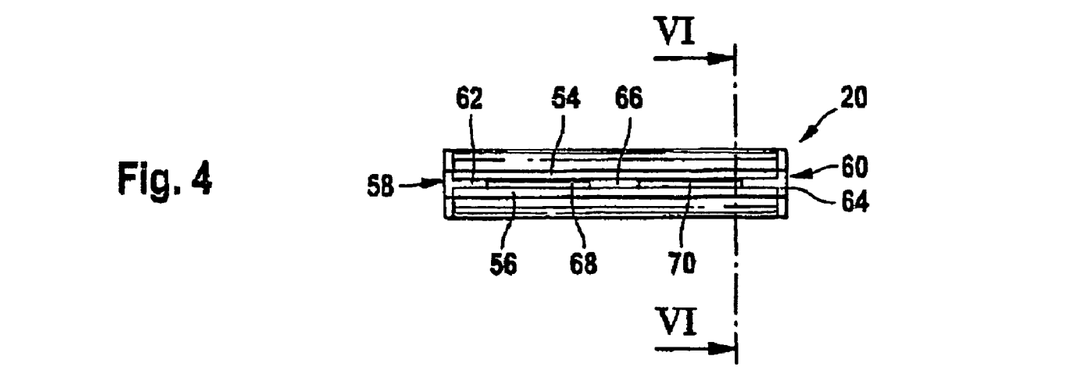
FIG. 4 shows an enlarged top view of the end face of the duct component of FIG. 3.
Figure 5:
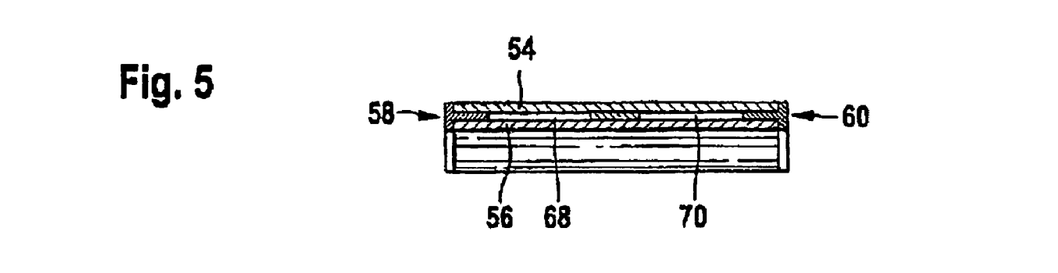
FIG. 5 shows an enlarged sectional view along the line V-V of FIG. 3.

As may be gathered from the top view of FIG. 4 and from the sectional view of FIG. 5 along the line V-V in FIG. 3, the cooling-duct component 20 has two material strips 54 and 56 which are arranged parallel to one another. Supporting members 58 and 60 are arranged at adjacent longitudinal edges of the material strips 54 and 56. The supporting members 58, 60 each have a spacer web 62 which extends between the material strips 54, 56. The material strips 54 and 56 come to bear respectively on the top side and the underside of the spacer webs 62, so that the material strips are arranged at a defined distance from and parallel to one another. The supporting members 58, 60 also each have a fixing web 64 which is arranged perpendicularly to the spacer web 62. For mounting the cooling-duct component 20, the supporting members 58, 60 are pushed in between the material strips 54, 56 until their longitudinal edges butt against the fixing web 64.

A spacer strip 66 is arranged centrally to the supporting members 58, 60 between the material strips 54, 56. With the aid of the spacer strip 66, the distance between the material strips 54, 56 is kept constant over their entire width. The cross section of the cooling ducts 68 and 70 formed between the material strips 54, 56 is consequently also constant over the entire length of the cooling-duct component 20. By the material strips 54, 56 coming to bear respectively on the top side and the underside of the spacer web 62 and, with their longitudinal edges, against the fixing web 64, the cooling ducts 68, 70 have a defined cross section, without difficult adjustments having to be carried out during the mounting of the cooling-duct component 20.

Figure 6:
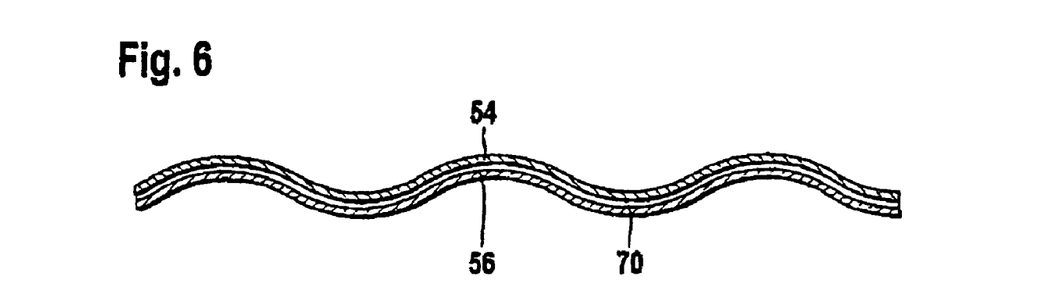
FIG. 6 shows a partial longitudinal section of the duct component of FIG. 3.

The wavy profile of the material strips 54, 56 can be seen clearly in the sectional view of FIG. 6 along the line VI-VI of FIG. 4. The material strips 54, 56 are arranged parallel to one another over their entire length and between them form the cooling duct 70. The wavy shape of the material strips can be achieved, for example, simply by the bending of the material strips or by the shaping of the material strips during the production process. In the embodiment illustrated, the heat exchanger structure consists of polycarbonate plastic.

Figure 7:
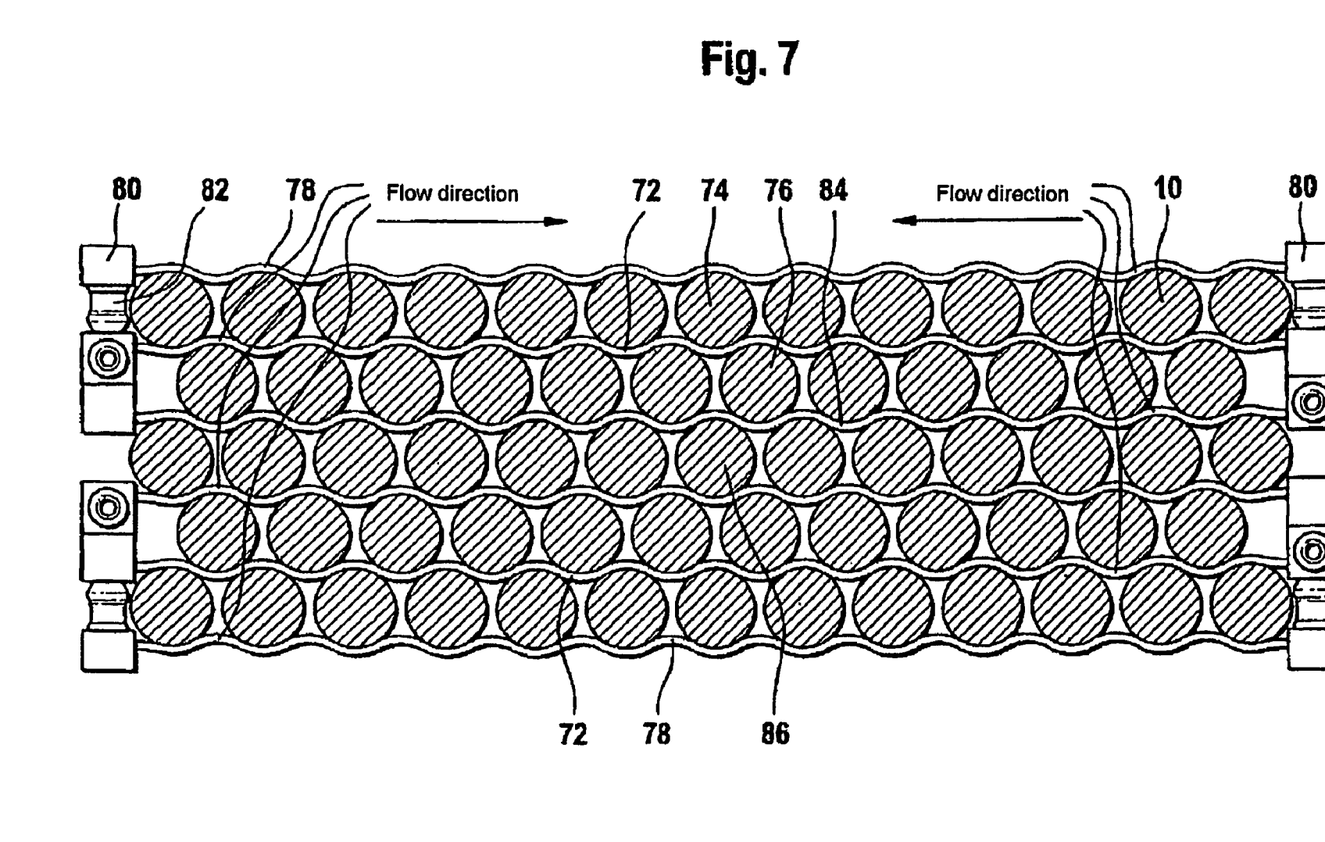
FIG. 7 shows a sectional view of an energy store according to the first embodiment of the invention.

The sectional view of FIG. 7 illustrates an energy store according to the invention which has five parallel layers of storage cells 10. Each layer of storage cells 10 is received between two cooling modules, such as were described in connection with FIGS. 1 to 7. The individual layers of storage cells 10 are in each case offset relative to one another by the amount of half a wavelength of the wavy cooling-duct components 20. As can be seen in FIG. 7, a highly compact arrangement of the storage cells is thereby obtained, in which a cooling-duct component 72 arranged between two layers engages alternately with storage cells of a first layer 74 arranged above and with storage cells of a second layer 76 arranged below. The cooling-duct components 72, 78 are connected to a distributor 80 on each of their end faces. The distributor ducts arranged in the distributors 80 are connected via connecting lines 82 to one another and to the cooling ducts in the cooling-duct components 72, 78 in such a way that the cooling liquid changes direction from plane to plane. Thus, the cooling liquid in the cooling-duct component 72 between the first layer 74 and the second layer 76 flows contra-directionally to the cooling liquid in the cooling-duct component 84 between the second layer 76 and a third layer 86. The storage cells in the individual layers 74, 76, 86 are thereby cooled uniformly, irrespective of their position within a layer.

Figure 8:
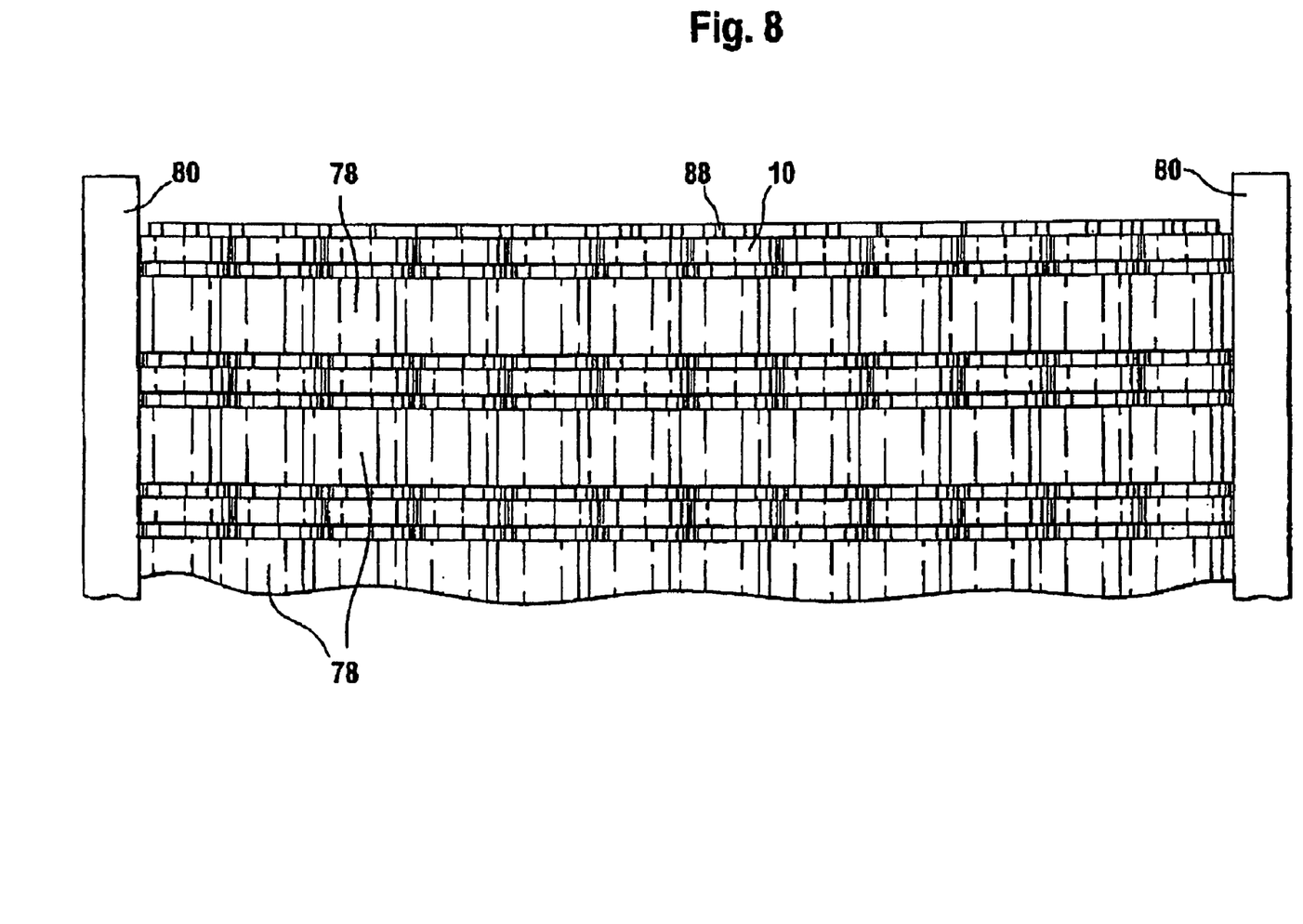
FIG. 8 shows a partial top view of the energy store of FIG. 7.

The distributors 80 and the cooling-duct components 78 arranged parallel to one another and connecting the distributors 80 can be seen in the top view, shown in FIG. 8, of the energy store of FIG. 7. Contacts 88, via which the individual storage cells 10 can be connected to one another, are accessible on the end faces of the storage cells 10.

Figure 9:
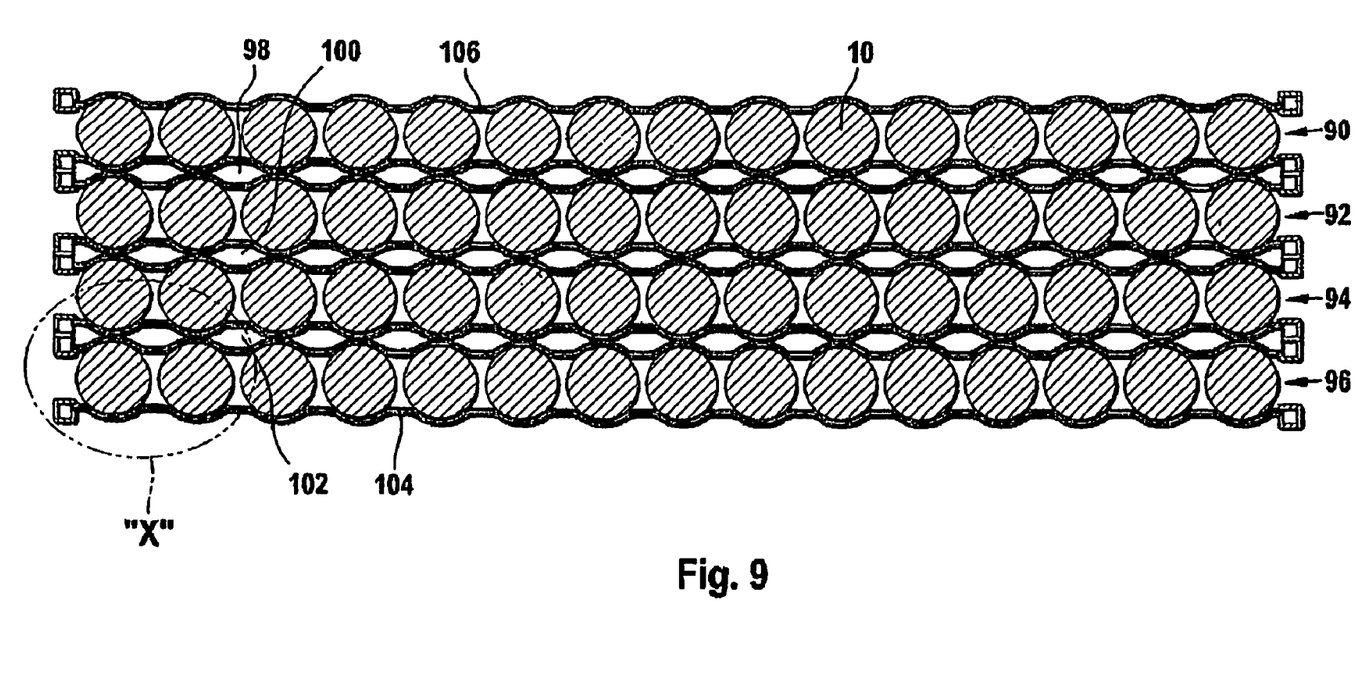
FIG. 9 shows a sectional view of an energy store according to a second embodiment of the invention.

An energy store, illustrated in section in FIG. 9, according to a second embodiment of the invention has four layers of storage cells 10, the layers being arranged parallel to one another. In contrast to the first embodiment illustrated in FIGS. 7 and 8, the parallel layers 90, 92, 94 and 96 are not arranged so as to be offset to one another. Cooling-duct components 98, 100 and 102 arranged between two layers 90, 92, 94 and 96 have in each case two cooling ducts for each cooling-duct component 98, 100 and 102. Only the lowermost cooling-duct component 104 and the uppermost cooling-duct component 106 have only one cooling duct in each case.

Figure 10:
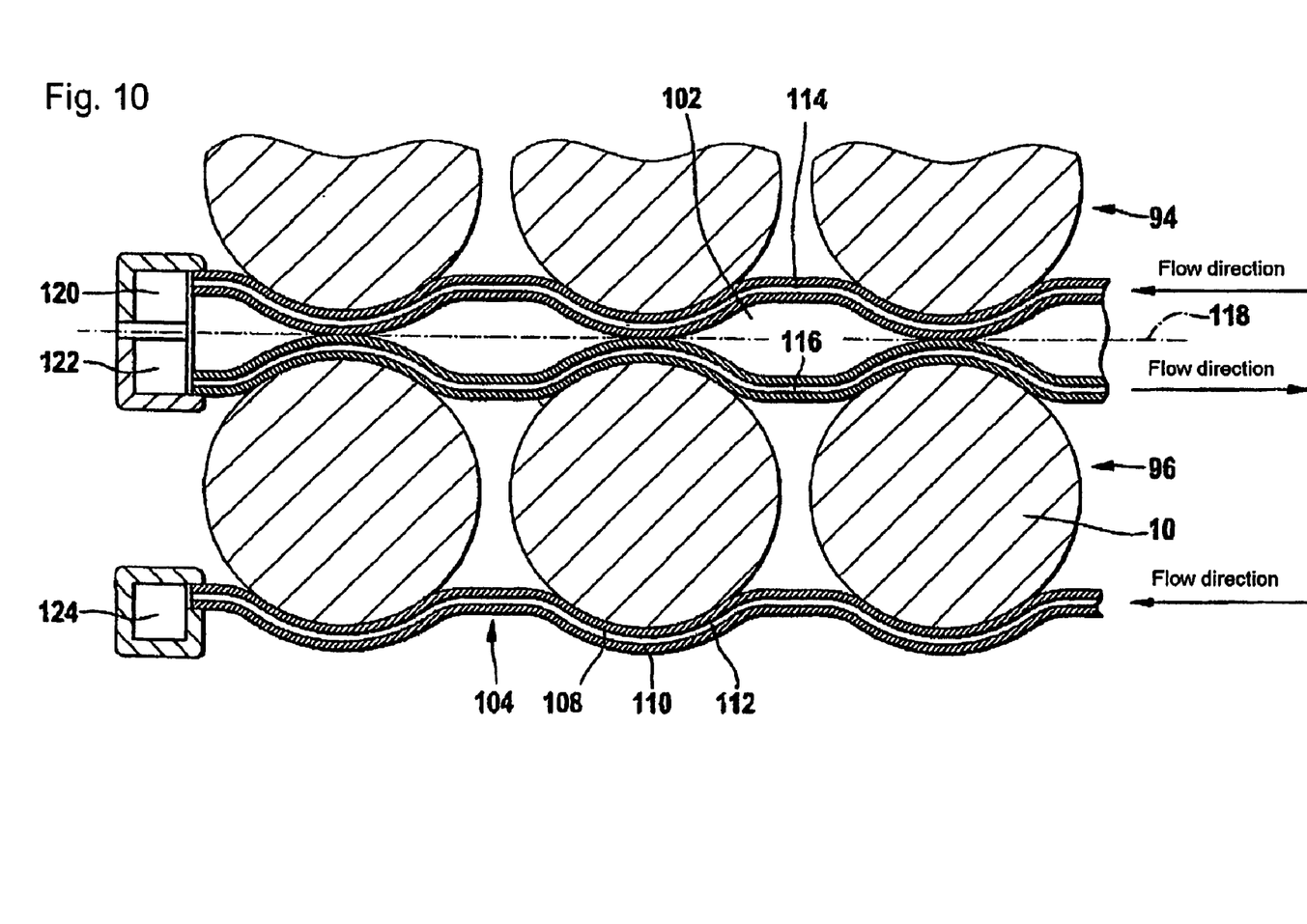
FIG. 10 shows an enlarged illustration of the detail X of FIG. 9.

FIG. 10 illustrates, enlarged, the detail X of the energy store illustrated in FIG. 9. The cooling-duct component 104 has material strips 108 and 110 which are arranged parallel to one another and between them form a cooling duct 112. The shaped portions of the material strips 108, 110 have the form of cylinder segments. The material strip 108 of the cooling-duct component 104 thereby engages on the storage cells 10 of the layer 96 with a form fit. As seen in the longitudinal direction of the material strips 108, 110, the material strips 108, 110 have shaped portions with co-directional curvatures. The cooling-duct component 102 arranged between the layers 94 and 96 has two cooling ducts 114 and 116, through which the cooling liquid flows in contra-directional directions. In the region of a plane 118 between the layers 94 and 96, a cooling-liquid contra-flow is thereby obtained, with the result that a particularly uniform thermal control of the storage cells 10 is possible. The cooling duct 114 issues into a distributor duct 120, and, as seen in the flow direction of the cooling liquid, the cooling duct 116 emanates from a distributor duct 122. The cooling duct 112 issues into a distributor duct 124.

Figure 11:
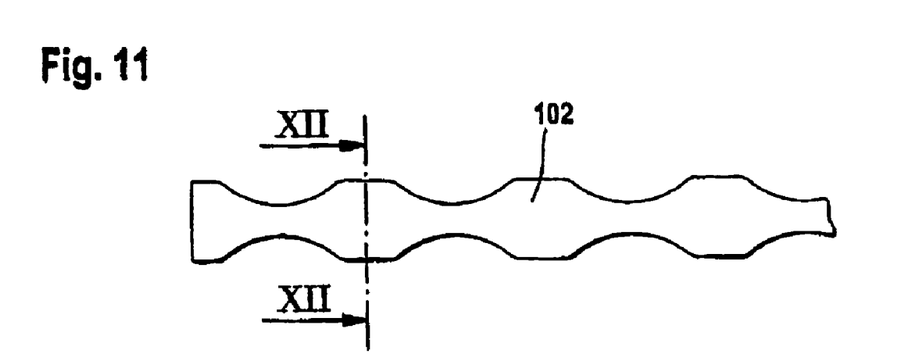
FIG. 11 shows a partial side view of a first duct component of FIG. 10.
Figure 12:
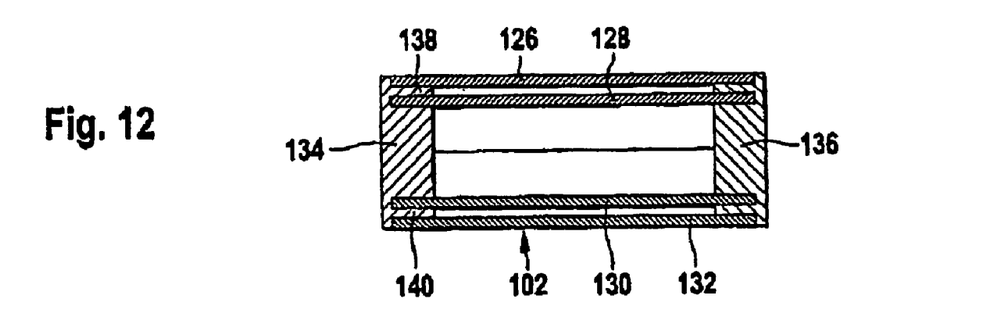
FIG. 12 shows an enlarged sectional view along the line XII-XII in FIG. 11.

FIGS. 11 and 12 illustrate the cooling-duct component 102 in more detail. The sectional view of FIG. 12 along the line XII-XII in FIG. 11 shows the construction of the cooling-duct component 102 from four material strips 126, 128, 130 and 132 and two supporting members 134 and 136. The supporting member 134 is produced in one piece and, by means of the spacer web 138, holds the material strips 126 and 128 at a defined distance from and parallel to one another. A spacer web 140 of the supporting member 134 holds the material strips 130 and 132 at a defined distance from and parallel to one another. The supporting member 136 is constructed identically to the supporting member 134.

Figure 13:
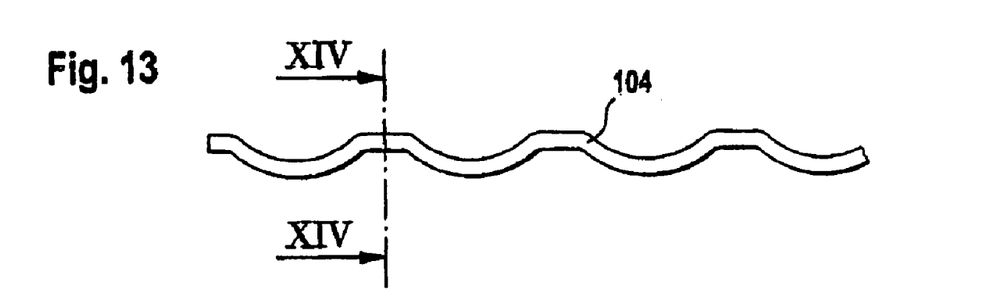
FIG. 13 shows a partial side view of a second duct component in FIG. 10.
Figure 14:
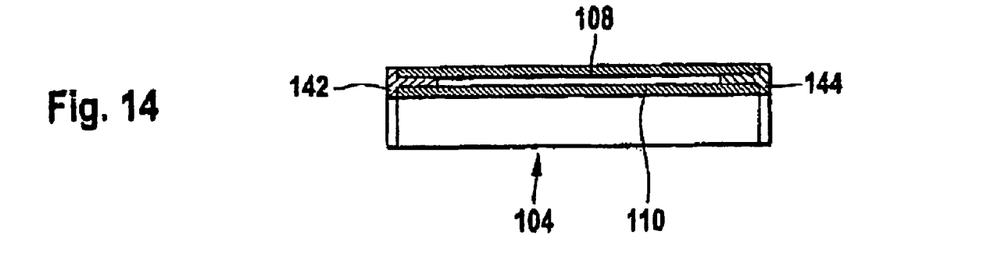
FIG. 14 shows an enlarged sectional view along the section XIV-XIV in FIG. 13.

The views of FIGS. 13 and 14 show detailed views of the cooling-duct component 104. In the sectional view of FIG. 14 along the line XIV-XIV of FIG. 13, it can be seen that the material strips 108 and 110 are held at a constant distance from and parallel to one another by means of two supporting members 142 and 144.

The invention claimed is:

1. A heat exchanger structure comprising:
a plurality of electrochemical storage cells, and
duct components including a plurality of cooling ducts, each of which is defined between respective pairs of material strips arranged parallel to one another over their length, through which thermal control medium flows,
wherein the material strips have wavy profiles adapted to the storage cells,
wherein the storage cells are arranged in a plurality of parallel layers,
wherein the thermal control medium flows through one duct component between a first layer of storage cells and a second layer of storage cells contra-directionally to the thermal control medium which flows through another, adjacent duct component, and
wherein the one duct component engages alternately with storage cells of the first and second layers.

2. The heat exchanger structure according to claim 1, wherein the thermal control medium flows through the first pair of the duct components, between the first and second layers of storage cells, in two contra-directional directions.

3. The heat exchanger structure according to claim 1, wherein the one duct component has supporting members arranged at adjacent longitudinal edges of the material strips, and wherein each of the supporting members has a spacer web extending between the material strips.

4. The heat exchanger structure according to claim 3, wherein at least one of the supporting members has a fixing web which extends perpendicularly to the spacer web and which is adapted to the wavy profiles of the material strips.

5. The heat exchanger structure according to claim 1, and further comprising a spacer strip extending in the longitudinal direction of the material strips provided between two of the material strips in their middle region.

6. The heat exchanger structure according to claim 1, wherein two one-piece supporting members are provided which connect each pair of the material strips at adjacent longitudinal edges.

7. The heat exchanger structure according to claim 1, wherein said duct component is one of a plurality of duct components arranged essentially in one plane and parallel to one another, and wherein adjacent end faces of the duct components are connected to a distributor.

8. The heat exchanger structure according to claim 7, wherein said distributor is one of at least two distributors which are connected by at least one fixing element running parallel to the duct components.

9. The heat exchanger structure according to claim 1, wherein the duct components form partially cylindrical segments.

10. The heat exchanger structure according to claim 1, wherein, as seen in a longitudinal direction, the material strips have alternately contra-directional curvatures.

11. The heat exchanger structure according to claim 1, wherein, as seen in a longitudinal direction, the material strips have co-directional curvatures.

12. An electrochemical energy store comprising a heat exchanger structure according to claim 1, wherein the electrochemical energy store is for a vehicle.

13. An electrochemical energy store comprising a heat exchanger structure according to claim 3, wherein the electrochemical energy store is for a vehicle.

14. An electrochemical energy store comprising a heat exchanger structure according to claim 4, wherein the electrochemical energy store is for a vehicle.

* * * * *